United States Patent [19]
Hosotani

[11] Patent Number: 6,130,824
[45] Date of Patent: Oct. 10, 2000

[54] SWITCHING POWER SUPPLY UNIT

[75] Inventor: Tatsuya Hosotani, Muko, Japan

[73] Assignee: Murata Manufacturing Co., Ltd., Japan

[21] Appl. No.: 09/454,065

[22] Filed: Dec. 2, 1999

[30] Foreign Application Priority Data

Dec. 2, 1998 [JP] Japan .................................. 10-343058

[51] Int. Cl.[7] .............................................. H02M 3/335
[52] U.S. Cl. .......................................................... 363/16
[58] Field of Search ................................. 363/15, 16, 20, 363/21, 95, 97, 131

[56] References Cited

U.S. PATENT DOCUMENTS

| 4,707,776 | 11/1987 | Somerville | 363/134 |
| 5,508,903 | 4/1996 | Alexandrov | 363/16 |
| 5,719,755 | 2/1998 | Usui | 363/19 |
| 6,005,782 | 12/1999 | Jain et al. | 363/21 |

FOREIGN PATENT DOCUMENTS 837777 2/1996 Japan .
8317647 11/1996 Japan .

*Primary Examiner*—Matthew Nguyen
*Attorney, Agent, or Firm*—Ostrolenk, Faber, Gerb & Soffen, LLP

[57] ABSTRACT

A switching power supply unit providing a DC output comprises a DC power supply; a transformer having a primary winding; a main switching element for connecting in series to the primary winding; and an auxiliary switching element for performing ON/OFF operations in synchronism with or opposite to ON/OFF operations performed by the main switching element; wherein an auxiliary switching element drive winding for generating a voltage turning on/off the auxiliary switching element is disposed in the transformer; and a first impedance circuit including a first resistor, a first capacitor being connected in series with the first impedance circuit, and a differentiating circuit for determining the timing for turning on the auxiliary switching element and the ON time thereof is connected to the auxiliary switching element drive winding.

17 Claims, 9 Drawing Sheets

SWITCHING POWER SUPPLY UNIT

BACKGROUND OF THE INVENTION

1. Field of the Invention

The present invention relates to a switching power supply unit having a main switching element and a single or a plurality of auxiliary switching elements which perform ON/OFF operations in synchronism with or opposite to ON/OFF operations of the main switching element.

2. Description of the Related Art

In general, in electronic equipment such as electronic calculators and communication devices, a switching power supply unit has been widely used for supplying a stabilized DC voltage from a commercial AC power supply. As the switching power supply unit, there are provided switching power supply units having different circuit systems, such as a forward converter, or a fly-back converter, in which a main switching element, which is connected in series to a primary winding of a transformer, is repeatedly turned on/off to intermittently apply an input voltage to the transformer so as to obtain a DC output through a rectifying and smoothing circuit connected to a secondary winding of the transformer. In contrast with these switching power supply units, there are provided various kinds of switching power supply units, in which improvement in circuit characteristics can be achieved by adding a circuit which includes an auxiliary switching element for performing ON/OFF operations in synchronism with ON/OFF operations of a main switching element or in reverse thereto.

A description will be given of a structure of a conventional switching power supply unit having such an auxiliary switching element referring to the drawings.

Figure 13:
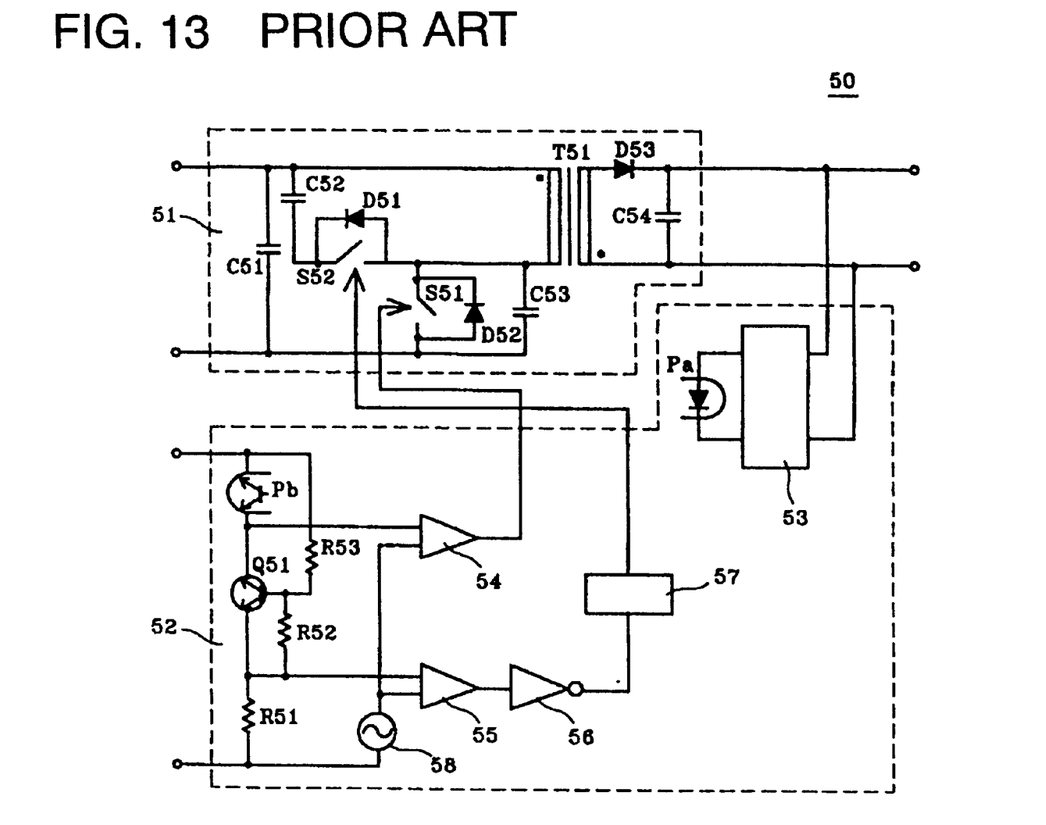
FIG. 13 is a circuit diagram illustrating a conventional switching power supply unit.

First, the conventional art disclosed in Japanese Unexamined Patent Publication No. 8-317647 will be illustrated with reference to FIG. 13.

In this figure, reference numeral 50 represents a switching power supply unit, which has a partial-resonance converter circuit 51 and a drive circuit 52. Of these components, the partial-resonance converter circuit 51 is composed of capacitors C51, C52, C53, and C54, diodes D51, D52, and D53, a transformer T51, a main switching element S51, and an auxiliary switching element S52.

In addition, the drive circuit 52 is composed of an output control circuit 53, comparators 54 and 55, an inverter 56, an isolation circuit 57, a triangle-wave oscillator 58, a light-emitting element Pa of a photo coupler, a light-receiving element Pb of the photo coupler, a transistor Q51, and resistors R51, R52, and R53.

In the switching power supply unit having the above-described structure, the auxiliary switching element S52 performs ON/OFF operations opposite to the ON/OFF operations of the main switching element S51.

Figure 14:
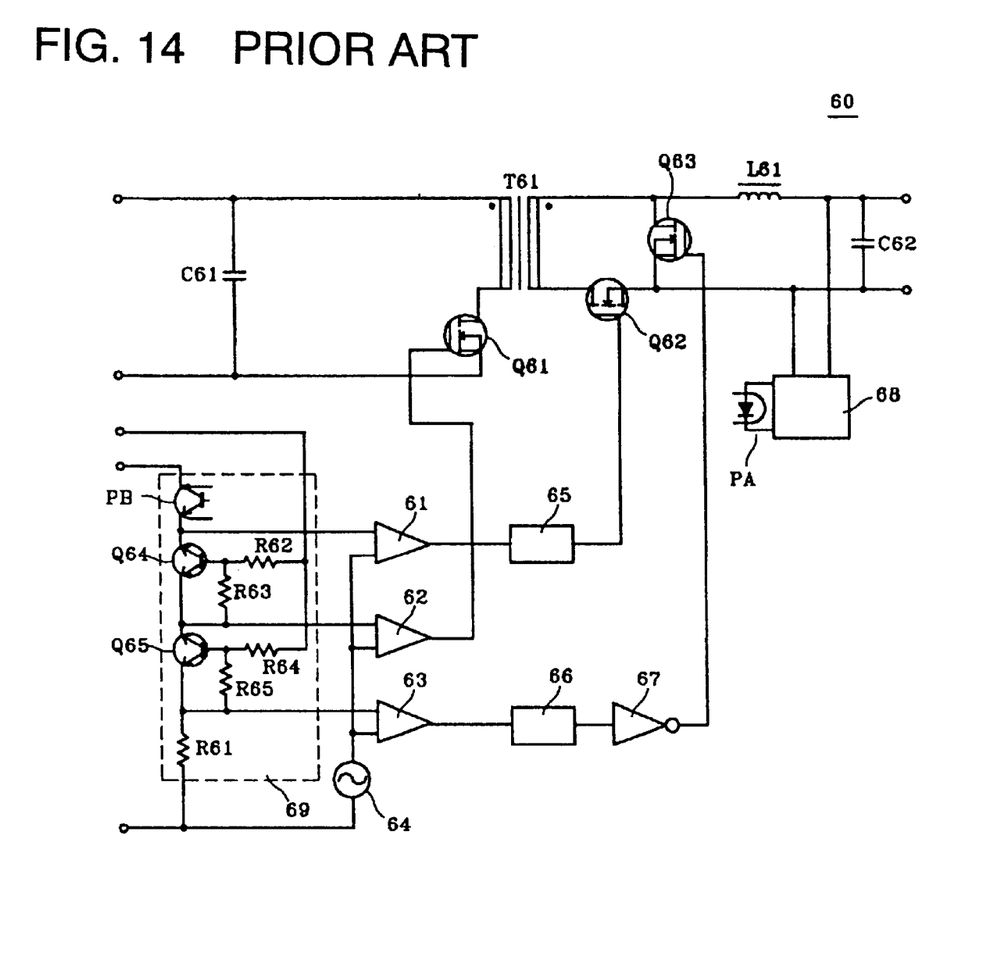
FIG. 14 is a circuit diagram illustrating another conventional switching power supply unit.

Next, another conventional art disclosed in Japanese Unexamined Patent Application No. 8-37777 will be illustrated with reference to FIG. 14.

In this figure, reference numeral 60 represents a switching power supply unit, in which an FET disposed on the secondary side of a transformer is used for rectification. This is generally referred to as a synchronous rectification system. The switching power supply unit 60 is composed of a transformer T61, an input capacitor C61, an FET Q61 as a main switching element, an FET Q62 as an auxiliary switching element, similarly, an FET Q63 as another auxiliary switching element, a choke coil L61, an output capacitor C62, a light-emitting-side photo coupler PA, a light-receiving-side photo coupler PB, comparators 61, 62, and 63, a triangle-wave oscillator 64, isolation an inverter 67, a control circuit 68, and a control-signal output circuit 69. Of these constituent parts, the control-signal output circuit 69 is composed of transistors Q64 and Q65, and resistors R61 to R65.

In the switching power supply unit 60 having the above-described structure, the FET Q62 performs ON/OFF operations in synchronism with the ON/OFF operations of the FET Q61, whereas the FET Q63 performs ON/OFF operations in opposition to the ON/OFF operations of the FET Q61.

In each of the above-described switching power supply units, however, the circuit part driving the auxiliary switching element is formed of an IC. Additionally, since a ground level is different between the main switching element and the auxiliary switching element, installation of an isolation circuit composed of photoelectric elements and/or transformers such as a pulse transformer and a photo coupler is necessary. In this way, when an IC, a pulse transformer, or the like is used, the circuit structure is complicated and production cost is increased. Further, and possibly more important such an increase in the number of parts can also increase in size and weight.

SUMMARY OF THE INVENTION

The present invention can solve the aforementioned drawbacks associated with the conventional switching power supply unit and provides a switching power supply unit capable of reducing cost, size, and weight, by simply and easily forming a circuit for controlling an auxiliary switching element performing ON/OFF operations in synchronism with or in opposition to the ON/OFF operations of a main switching element in which an IC and an isolation circuit are not used.

The switching power supply unit according to the invention includes a DC power supply, a transformer having a primary winding, a main switching element for connecting in series to the primary winding, and an auxiliary switching element for performing ON/OFF operations in synchronism with or in opposition to the ON/OFF operations performed by the main switching element so that a DC output can be obtained, in which an auxiliary switching element drive winding is disposed in the transformer to generate a voltage turning on and off the auxiliary switching element, a first impedance circuit including a first resistor and a first capacitor are mutually connected in series, and a differentiating circuit for determining the timing for turning on the auxiliary switching element and the ON time thereof is connected to the auxiliary switching element drive winding.

Furthermore, in the switching power supply unit of the invention, the auxiliary switching element comprises a transistor, the gate of which is connected to an end of the switching element drive winding via the first capacitor, the source of which is connected to the other end thereof, and the first impedance circuit is connected between the gate and the source of the transistor.

Additionally, in this switching power supply unit, the differentiating circuit has a second impedance circuit connected in series to the first capacitor.

Furthermore, in the above switching power supply unit, the second impedance circuit has one of a second resistor and an inductor.

In the switching power supply unit of the invention, the impedance value of one of the first and second impedance circuits or the impedance values of both thereof vary with the direction of current flowing through one or both of the impedance circuits.

Furthermore, in the switching power supply unit of the present invention, the second capacitor is connected in parallel to the first impedance circuit.

Furthermore, in the switching power supply unit of the present invention, the impedance value of the first impedance circuit varies with the DC output or signals from the outside of the first impedance circuit.

According to the switching power supply unit of the present invention, since the auxiliary switching element is driven by voltage generated in the auxiliary switching element drive winding of the transformer, the use of an IC or a photoelectric element such as a pulse transformer and a photo coupler is not necessary, so that decrease in the number of components, reduction in size, weight, and production cost, can be achieved.

In addition, the second impedance circuit suppresses an abrupt application of the voltage generated in the auxiliary switching element drive winding, and the operation for turning on the auxiliary switching element is thereby delayed so as to set a dead time, in which both the main switching element and the auxiliary switching element are turned off.

Furthermore, the ON time of the auxiliary switching element and the dead time can be adjusted by selecting the resistance value or the impedance value of a resistor comprising the second impedance circuit.

Furthermore, the voltage between the gate and the source of the auxiliary switching element is increased or decreased by selecting the resistance value or the impedance value of an element comprising the first impedance circuit and by selecting the capacity of the second capacitor to adjust the ON time of the auxiliary switching element so as to adjust the timing for turning off the auxiliary switching element and set a dead time in which both the main switching element and the auxiliary switching element are turned off. In addition, with this arrangement, the length of the dead time can be adjusted.

Furthermore, since the main switching element and the auxiliary switching element perform mutually reversed ON/OFF operations, with a dead time put between the operations, there are no problems with occurrence of losses and destruction of the elements resulting from the simultaneous turn-on of both elements.

Furthermore, the second impedance circuit suppresses occurrence of surge voltage between the gate and source of the auxiliary switching element.

Additionally, the inductor comprising the second impedance circuit permits the surge voltage between the gate and the source of the auxiliary switching element to be reduced.

Further, the first capacitor cuts off a direct current to reduce the drive loss of the auxiliary switching element.

Furthermore, variations in the capacitance can be controlled to enhance reliability by setting the capacitance of the second capacitor larger than the parasitic capacitance of the auxiliary switching element to make the capacitance of the second capacitor dominant.

Additionally, since the impedance value of the first impedance circuit varies or switches according to the output of the switching power supply unit, the impedance value between the gate and the source of the auxiliary switching element can be adjusted. This permits the ON time of the auxiliary switching element to be most appropriately adjusted according to the output of the switching power supply unit.

In addition, since the impedance value of the first or second impedance circuit changes according to the direction of current flowing through the circuit, the most appropriate impedance value can be set according to a positive voltage and a negative voltage generated in the auxiliary switching element drive winding or the on/off ratio of the auxiliary switching element. Furthermore, an impedance value, in which variations in the ON time of the auxiliary switching element are minimized with respect to variations in the on/off ratio of the auxiliary switching element, can be set.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

Figure 1:
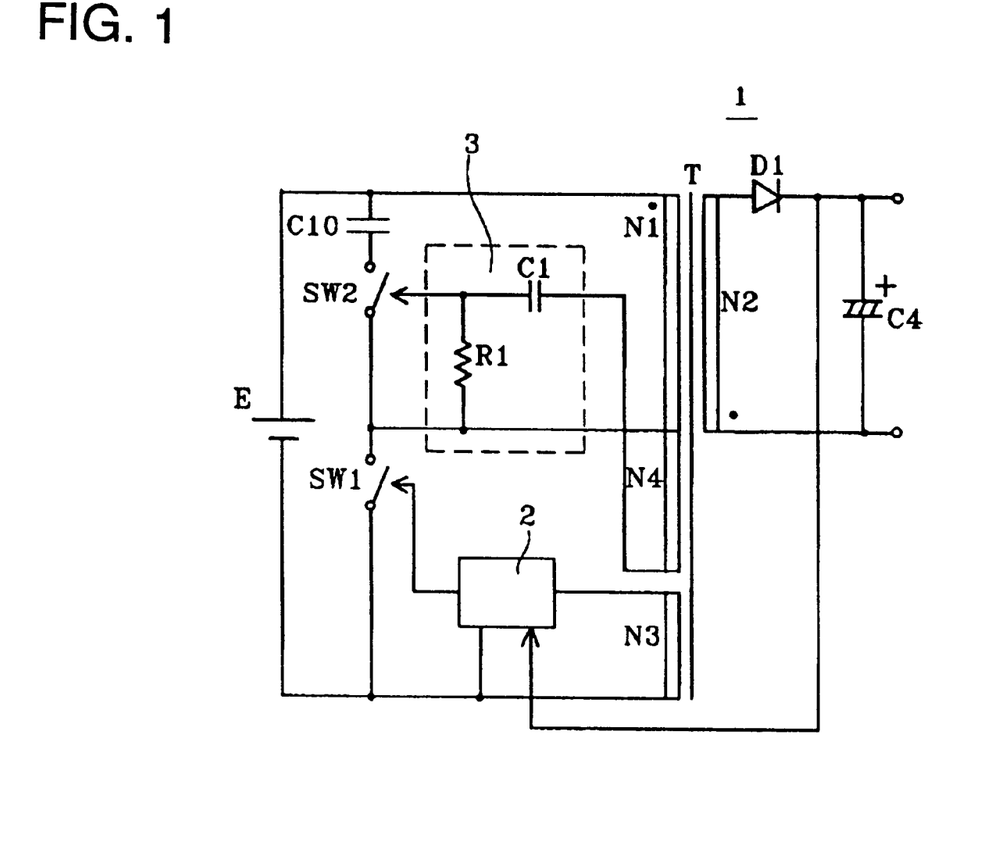
FIG. 1 is a circuit diagram illustrating the basic structure of a switching power supply unit according to the present invention.

In FIG. 1, reference numeral 1 represents a switching power supply unit, which is an application circuit of the one ordinarily referred to as a fly-back converter. The switching power supply unit 1 includes a DC power supply E, a transformer T, a capacitor 10, a main switching element SW1, an auxiliary switching element SW2, a main switching element control circuit 2, and a differentiating circuit 3.

The transformer T has a primary winding N1, a secondary winding N2, a main switching element drive winding N3, and an auxiliary switching element drive winding N4. Additionally, on the secondary side of the transformer T is disposed a rectifying diode D1 and a smoothing capacitor C4.

In addition, as the transformer, an inductance element using the entire part or a part of the primary winding and the secondary winding may be used.

The main switching element control circuit 2 uses the voltage generated in the main switching element drive winding N3 to control the drive of the main switching element SW1. When the main switching element SW1 is turned on, the voltage generated in the DC power supply E is applied to the primary winding N1 of the transformer T so as to charge energy in the primary winding N1. In contrast, when it is turned off, energy discharged from the secondary winding N2 is rectified and smoothed by the diode D1 and the capacitor C4 to supply electrical power to a load.

The differentiating circuit 3 is composed of a first resistor and a first capacitor connected in series to each other. This circuit 3 uses voltage generated in the auxiliary switching element drive winding N4 to control the drive of the auxiliary switching element SW2 so as to alternately turn on/off the auxiliary switching element SW2 with respect to the main switching element SW1.

Next, an embodiment of the switching power supply unit having the above basic structure will be illustrated referring to the drawings.

Figure 2:
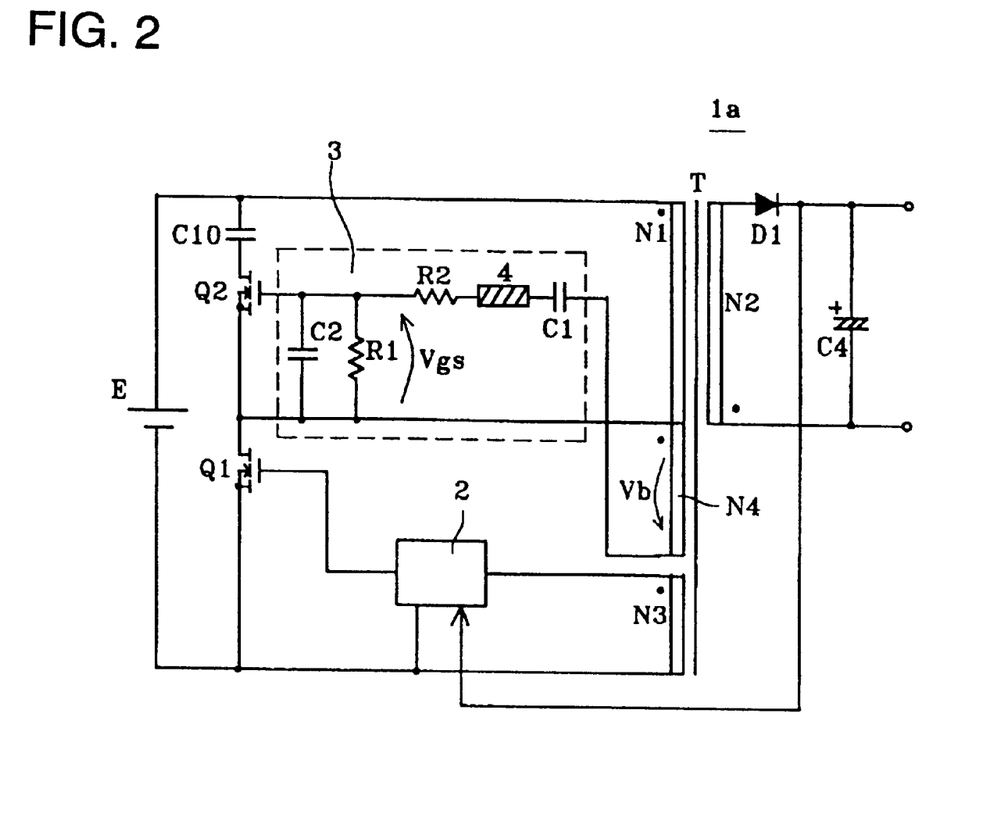
FIG. 2 is a circuit diagram illustrating a switching power supply unit according to a first embodiment of the present invention.

In FIG. 2, reference numeral 1a indicates a switching power supply unit in accordance with a first embodiment. This adopts an active clamp system in the application circuit of a fly-back converter, in which a surge voltage to the main switching element is clamped.

The switching power supply unit 1a has a DC power supply E and a transformer T. The DC power supply E may be obtained by rectifying and smoothing an AC input. In addition, the transformer T has a primary winding N1, a secondary winding N2, a main switching element drive winding (hereinafter referred to as a first drive winding) N3, and an auxiliary switching element drive winding ((hereinafter referred to as a second drive winding) N4.

In addition, a field-effect transistor (hereinafter referred to as an FET) Q1 as the main switching element, the primary winding N1 of the transformer T, and the DC power supply E are connected in series, and a field-effect transistor (FET) Q2 as the auxiliary switching element, and a capacitor C10 are connected between both ends of the primary winding N1 of the transformer T.

In this case, the gate of the FET Q1 is connected to an end of the first drive winding N3 via the main switching element control circuit (hereinafter referred to as a main control circuit) 2, the source thereof is connected to the DC power supply E, and the drain thereof is connected to an end of the primary winding N1. The source of the FET Q2 is connected to the drain of the FET Q1, the gate of the FET Q2 is connected to an end of the second drive winding N4 of the transformer T via the auxiliary switching element control circuit (hereinafter referred to as an auxiliary control circuit) 3, and the drain thereof is connected to the capacitor C10.

Furthermore, the gate and the source of the FET Q2 are connected to the second drive winding N4 via the auxiliary control circuit 3. In this case, the auxiliary control circuit 3 includes a resistor R1 as a first impedance circuit, a resistor R2 and a bead 4 as a second impedance circuit, a capacitor C1 as a first capacitor, and a capacitor C2 as a second capacitor. Among these components, the resistors R1 and R2, the bead 4, and the capacitor C1 are mutually connected in series to form a differentiating circuit. In addition, the resistor R1 is connected between the gate and the source of the FET Q2, and the capacitor C2 is connected in parallel to the resistor R1.

Furthermore, the switching power supply unit 1a has a diode D1 as a rectifying circuit and a capacitor C4 as a smoothing circuit on the secondary side of the transformer T.

As the first impedance circuit, a resistance parasitically existing inside of the FET Q2 may be used, and as the second capacitor, a capacitance parasitically existing inside of the FET Q2 may be used.

Next, the operation of the switching power supply unit 1a having the above structure will be illustrated below.

First, on startup, voltage is applied to the gate of the FET Q1 via a starting resistor (not shown) disposed in a main control circuit 2, whereby the FET Q1 is turned on. As the FET Q1 is turned on, voltage of the same polarity mutually occurs in the primary winding N1 of the transformer T and the first drive winding N3, whereby the FET Q1 is in the ON state so as to charge excitation energy in the primary winding N1.

In addition, when the FET Q1 is turned off by the main control circuit 2, excitation energy charged in the primary winding N1 of the transformer T is discharged as electric energy via the secondary winding N2 and then rectified to be smoothed by the diode D1 and the capacitor C4 so as to supply power to a load.

Then, when the excitation energy charged in the primary winding N1 of the transformer T is all discharged via the secondary winding N2, a voltage having the same polarity as that of the voltage generated on startup is generated so as to turn on the FET Q1. As a result, with ON/OFF operations of the FET Q1, electric energy is supplied to the load.

The FET Q2 performs ON/OFF operations opposite to the ON/OFF operations of the FET Q1 to reduce the switching losses and switching surges of the FET Q1. The operations of the FET Q2 will be illustrated below.

First, as the FET Q1 is turned off, a voltage of the polarity opposite to a voltage generated on startup of the FET Q1 is generated in winding N4. This voltage Vb permits a voltage to be applied between the gate and the source of the FET Q2, and then, the voltage Vgs between the gate and the source of the FET Q2 exceeds a threshold voltage Vth of the FET Q2 to turn on the FET Q2.

Figure 3:
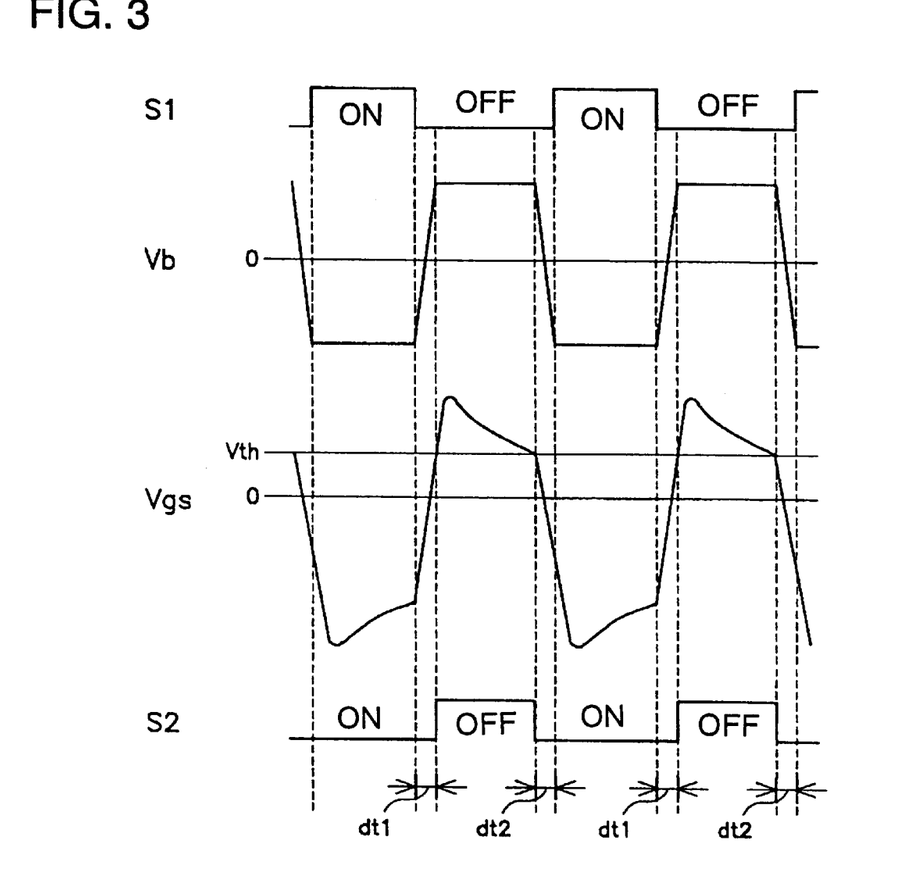
FIG. 3 is a waveform chart showing a voltage in each part of the switching power supply unit shown in FIG. 2.

Next, referring to FIG. 3, a description will be given of the operations of the FET Q1 and FET Q2. In this figure, reference numerals S1 and S2 schematically indicate the ON/OFF state of the FET Q1 and FET Q2. Reference numeral Vb indicates voltages at both ends of the second drive winding N4 of the transformer T, and reference numeral Vgs indicates a voltage between the gate and the source of the FET Q2.

The drive pulses S1 and S2 perform mutually-reversed ON/OFF operations, with a dead time dt1 and a dead time dt2 therebetween, in which both of them are off.

When the FET Q1 is turned on, the positive voltage Vb is generated in the second drive winding N4 and applied to the gate of the FET Q2. In this situation, the voltage Vgs between the gate and the source of the FET Q2, that is, a voltage applied between both ends of the resistor R1 comprising the differentiating circuit makes a rapid ascent. Then, at a time in which the voltage Vgs between the gate and the source exceeds a threshold voltage Vth of the FET Q2, the FET Q2 is turned on. After this, the voltage Vgs between the gate and the source reaches a peak value. Next, with the differentiating circuit comprising the capacitor C1 and the resistor R1, the voltage Vgs between the gate and the source is attenuated at a CR time constant value determined by the capacitance value C of the capacitor C1 and the resistance value R of the resistor R1, and again reaches the threshold voltage Vth. This operation terminates the ON time of the FET Q2, and when the FET Q1 is next turned on, the polarity of the voltage Vb is reversed.

Then, when the FET Q1 is turned off again, the positive voltage Vb is generated in the second drive winding N4 and applied to the gate of the FET Q2 so as to increase the voltage Vgs between the gate and the source, and furthermore the changes described above are repeated.

As a result, the time that takes the voltage Vgs between the gate and the source after exceeding the threshold voltage Vth of the FET Q2 to reach the threshold voltage Vth by attenuation due to the CR time constant of the differentiating circuit is equivalent to the ON time of the drive pulse S2 of the FET Q2.

Furthermore, since the resistor R2 and the bead 4 comprising the second impedance circuit permits an abrupt application of the voltage Vb between both ends of the resistor R1 to be suppressed, rising of the voltage Vgs is not vertical but inclined. This permits the turn-on of the FET Q2 to be delayed with respect to the turn-off of FET Q1, so that a dead time dt1, in which both FET Q1 and FET Q2 are off, is generated. Therefore, inclination of the rising of the voltage Vgs can be adjusted so as to adjust the length of the dead time dt1 depending on how much resistance value or impedance value the elements as the resistor R2 and the bead 4 have.

Figure 4:
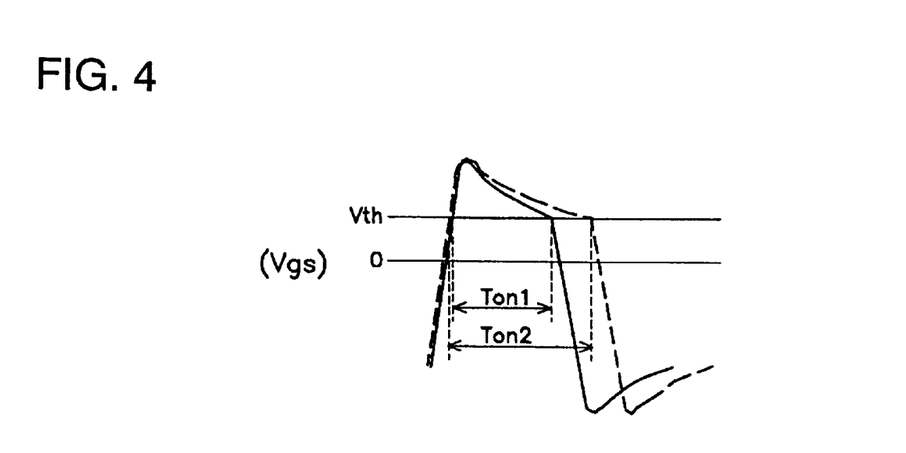
FIG. 4 is a waveform chart showing a voltage between the gate and the source of an auxiliary switching element constituting the switching power supply unit shown in FIG. 2.

Furthermore, since the ON time of the FET Q2 is the time that takes the voltage Vgs between the gate and the source to reach the threshold voltage Vth of the FET Q2 after its attenuation at the CR time constant, the ON time of the FET Q2 can be arbitrarily set by adjusting either one of the capacitance value of the capacitor C1 and the resistance value of the resistor R1 or both of them to set the CR time constant. FIG. 4 shows a waveform (a solid line) of the voltage Vgs between the gate and the source in the case where the CR time constant is relatively small, and an ON time Ton 1, whereas a waveform (the dotted line) thereof in the case where the CR time constant is relatively large, and an ON time Ton 2.

In addition, the peak value of the voltage Vgs between the gate and the source applied to the gate of the FET Q2 can be adjusted as follows, by using the fact that a voltage applied to a capacitor in a voltage divider is inversely proportional to its capacitance.

That is, a voltage generated in the second drive winding N4 and applied to the capacitor C2 is divided by the capacitors C1 and C2. Then, making the capacitance of the capacitor C1 smaller than that of the capacitor C2 permits the peak value of the voltage Vgs between the gate and the source to be small.

Furthermore, in contrast with this, making the capacitance of the capacitor C1 larger than that of the capacitor C2 permits the peak value of the voltage Vgs between the gate and the source to be large.

Figure 5:
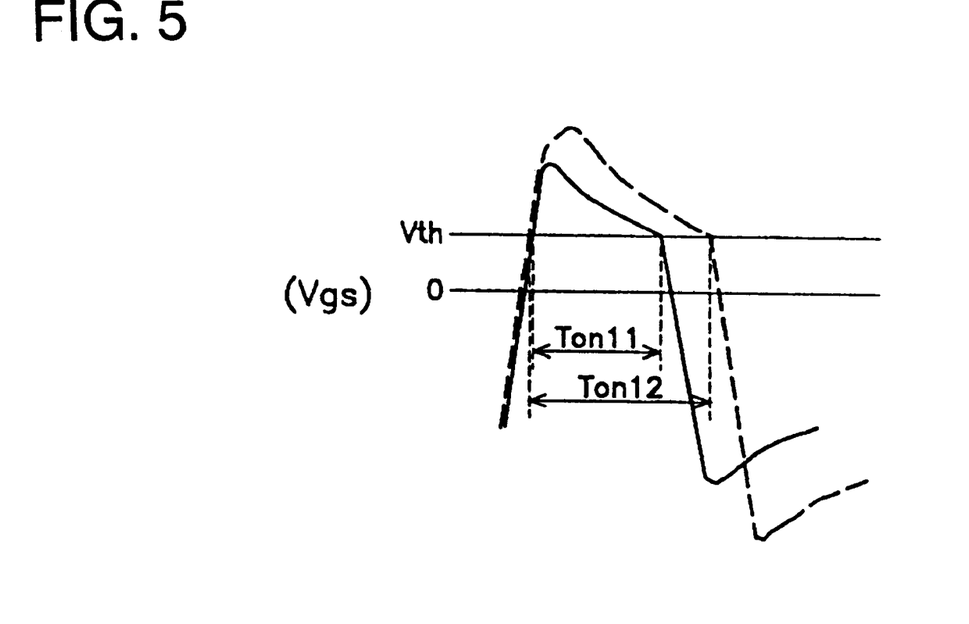
FIG. 5 is a waveform chart showing a voltage between the gate and the source of another auxiliary switching element constituting the switching power supply unit shown in FIG. 2.

FIG. 5 shows changes in the voltage Vgs between the gate and the source obtained by changing the capacitance ratios of the capacitor C1 and the capacitor C2, as described above. In this figure, the waveform of the voltage Vgs between the gate and the source indicated by a dotted line is equivalent to the one obtained by enlarging the waveform indicated by a solid line in an approximately vertical direction. In this way, when the waveform of the voltage Vgs between the gate and the source is changed from the one indicated by the solid line to the one indicated by the dotted line, the time that it takes to reach the threshold voltage Vth is longer, with the result that the ON time of the FET Q2 is prolonged from Ton 11 to Ton 12. Meanwhile, when the waveform of the voltage Vgs between the gate and the source is changed from the one indicated by the dotted line to the one indicated by the solid line, the ON time of the FET Q2 is shortened from Ton 12 to Ton 11.

In this way, the ON time of the FET Q2 is adjusted and the FET Q2 is thereby turned off before the FET Q1 is turned on, whereby a dead time dt2, in which both the FETs Q1 and Q2 are off, is provided.

It is possible to use the parasitic capacitance parasitically existing inside the FET Q2 as the capacitor C2 in order to perform the same adjustment.

As described above, in the switching power supply unit 1a, since the FETs Q1 and Q2 perform mutually-reversed ON/OFF operations with the dead times dt1 and dt2 placed therebetween, there is no problem with losses and destruction of the elements occurring due to the simultaneous turn-on of the two FETs.

Furthermore, since the FET Q2 as an auxiliary switching element is driven by voltage generated in the second drive winding N4 of the transformer T, it is not necessary to use an IC and a photoelectric element such as a pulse transformer or a photo coupler, so that reduction in component count, size, weight, and production cost, can be achieved.

Figure 6:
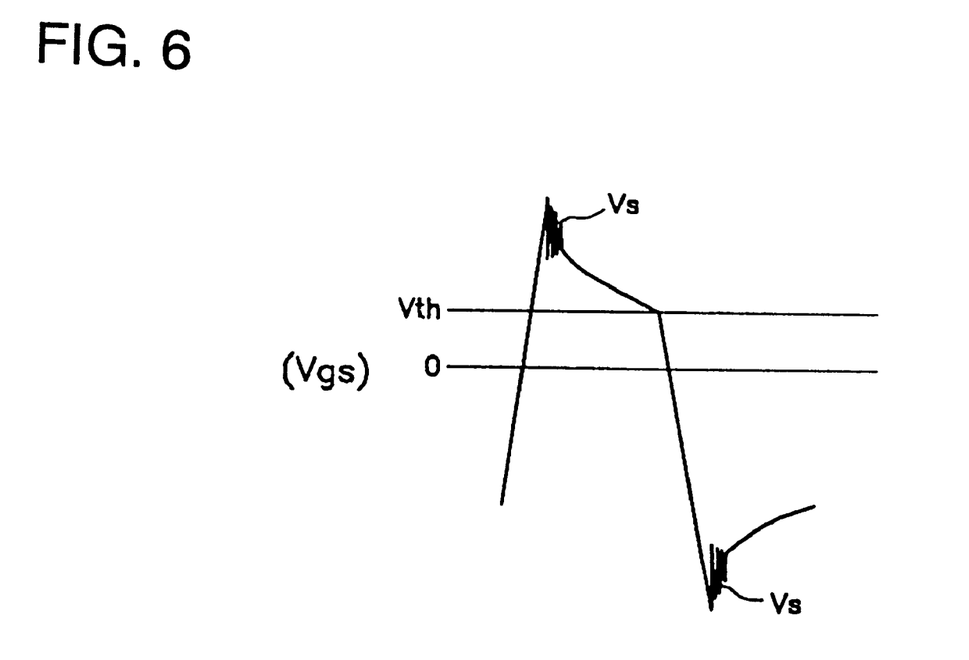
FIG. 6 is a voltage waveform chart including the surge voltage between the gate and the source of the auxiliary switching element constituting the switching power supply unit shown in FIG. 2.

Furthermore, the resistor R2 and the bead 4 comprising the second impedance circuit permit the occurrence of a surge voltage between the gate and the source of the FET Q2 shown by reference character Vs in FIG. 6 to be suppressed. In contrast, when there is no problem with the occurrence of the surge voltage, no resistor and bead as the second impedance circuit are necessary, so as to make the rising of the voltage between the gate and the source steep.

The bead 4 reduces the surge voltage occurring between the gate and the source of the FET Q2.

An inductor may be used for the bead 4. Alternatively, both the bead and the inductor may be used together.

The capacitor C1 as the first capacitor permits direct current to be cut off so as to reduce the drive loss of the FET Q2.

In addition, when the parasitic capacitance between the gate and the source of the FET Q2 is likely to vary due to the characteristics of an element used as the FET Q2, the capacitor C2 is connected between the gate and the source of the FET Q2 so that the capacitance of the capacitor C2 is made dominant, whereby variations in the parasitic capacity between the gate and the source can be suppressed so as to achieve improvement in reliability.

Next, a description will be given of a modification of the switching power supply unit 1a referring to FIG. 7. In this figure, only the main part is shown, in which the same components as those in FIG. 2 or the equivalent thereto are given the same reference numerals, and the explanation of those parts are omitted.

Figure 7:
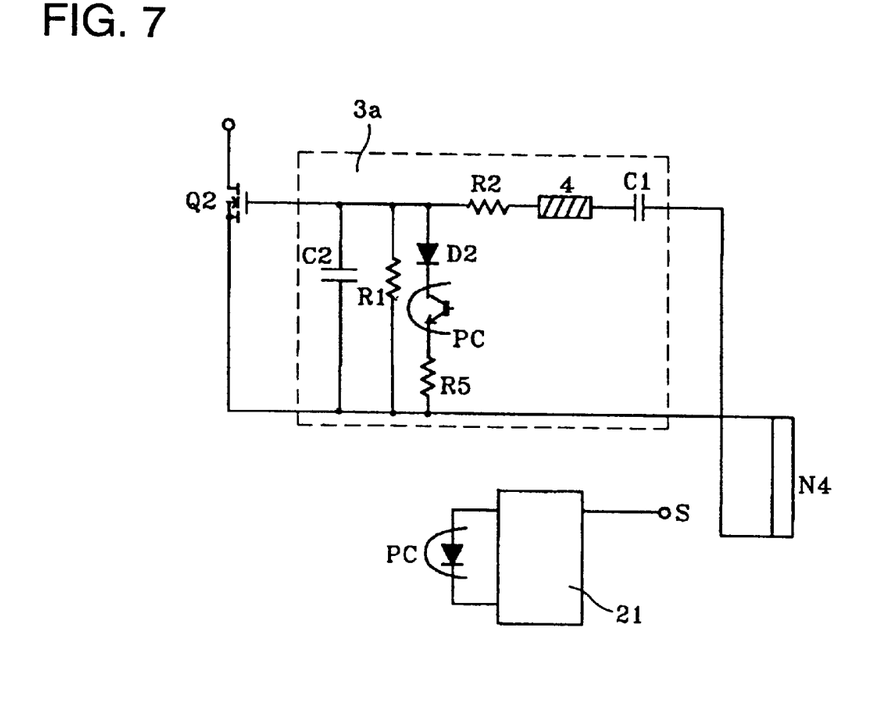
FIG. 7 is a circuit diagram showing a modification of the switching power supply unit shown in FIG. 2.

In FIG. 7, the auxiliary control circuit 3a has a series circuit comprising a diode 2, a photo coupler PC, and a resistor R5, which are connected in parallel to the resistor R1 as the first impedance circuit. Among these components, a part of the photo coupler PC is disposed in a control circuit 21, which has an input terminal S. A feedback from the output of the switching power supply unit 1a is provided to the input terminal S. According to the output, the impedance value of the photo coupler PC is changed, and the impedance value between the gate and the source of the FET Q2 is thereby changed.

In this case, the impedance value of the photo coupler PC may be changed not by the feedback from the output but by signals. Under the circumstances, the impedance value can be adjusted by signals input to the input terminal S of the control circuit 21 from a control circuit (not shown) in the main body of an apparatus equipped with the switching power supply unit 1a, or from a different control circuit (not shown) inside the switching power supply unit 1a.

Changes in the impedance value described above include both the cases where the value changes in a sliding form in a fixed value range, and where it switches into one of the specified plural values.

As described above, in the auxiliary control circuit 3a, changing the impedance between the gate and the source between the FET Q2 according to the output of the switching power supply unit 1a or by the signals permits the CR time constant of the differentiating circuit to be adjusted, as well as permits the value of the voltage Vgs between the gate and the source applied to the gate of the FET Q2 to be changed to determine the ON time of the FET Q2, with the result that the FET Q2 can be turned off at the most appropriate timing according to the output.

Furthermore, the first or second impedance circuit comprising the auxiliary control circuit of the switching power supply unit of the present invention should not be restricted to the one described above. For example, it is possible to use the one shown in each of FIGS. 8 to 11. Each of these figures shows only the main part and the same parts as those in FIG. 2 or the equivalent parts thereto are given the same reference numerals, in which the explanation thereof is omitted.

Figure 8:
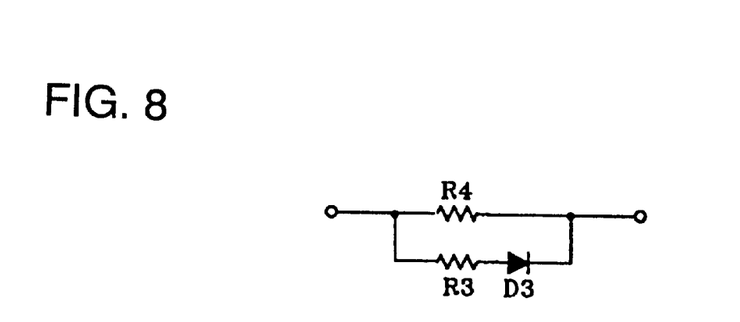
FIG. 8 is a circuit diagram showing another modification of the switching power supply unit shown in FIG. 2.

The impedance circuit shown in FIG. 8 comprises a resistor 3 and a diode D3 mutually connected in series, and a resistor 4 connected in parallel thereto.

Figure 9:
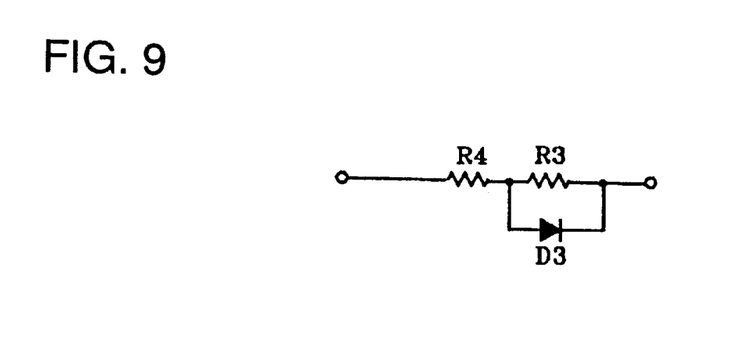
FIG. 9 is a circuit diagram showing another modification of the switching power supply unit shown in FIG. 2.

The impedance circuit shown in FIG. 9 comprises the resistors 3 and 4, and the diode D3 connected in parallel to the resistor 3.

Figure 10:
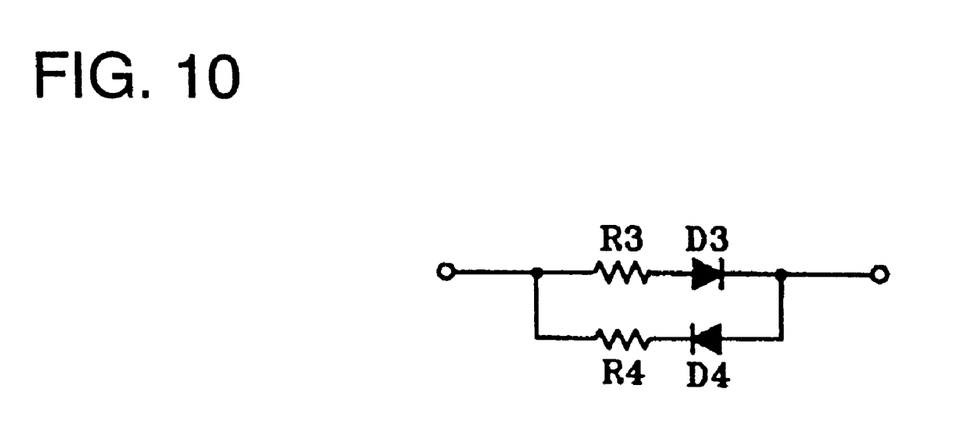
FIG. 10 is a circuit diagram showing another modification of the switching power supply unit shown in FIG. 2.

The impedance circuit shown in FIG. 10 comprises the resistor 3 and the diode D3 mutually connected in series and the resistor 4 and the diode D4 mutually connected in series. In this case, the diodes D3 and D4 are arranged in a mutually reverse direction.

Figure 11:
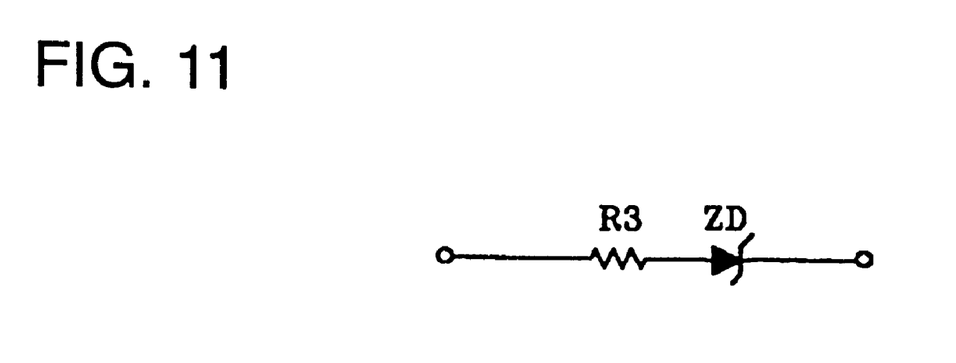
FIG. 11 is a circuit diagram showing another modification of the switching power supply unit shown in FIG. 2.

The impedance circuit shown in FIG. 11 comprises the resistor 3 and a Zener diode ZD mutually connected in series.

In each impedance circuit shown in FIGS. 8 to 11, resistance differs and the impedance value thereby changes depending on the case in which a current direction is forward of the diode or reverse thereto.

As seen above, in each of the above-described impedance circuits, since it is possible to change the impedance value by a current direction, for example, the most appropriate impedance value can be set according to a positive voltage and a negative voltage occurring in the second drive winding N4 of the transformer T, or the ON/OFF ratio of the FET Q2.

Furthermore, it is also possible to set the impedance value in such a manner that variations in the ON time of the FET Q2 are smaller than those in the ON/OFF ratio of the FET Q1.

Particularly, as the second impedance circuit, with respect to the one shown in each of FIGS. 8 to 11, either one of the capacitor C1 and the bead 4 or both of them may be added or replaced.

Figure 12:
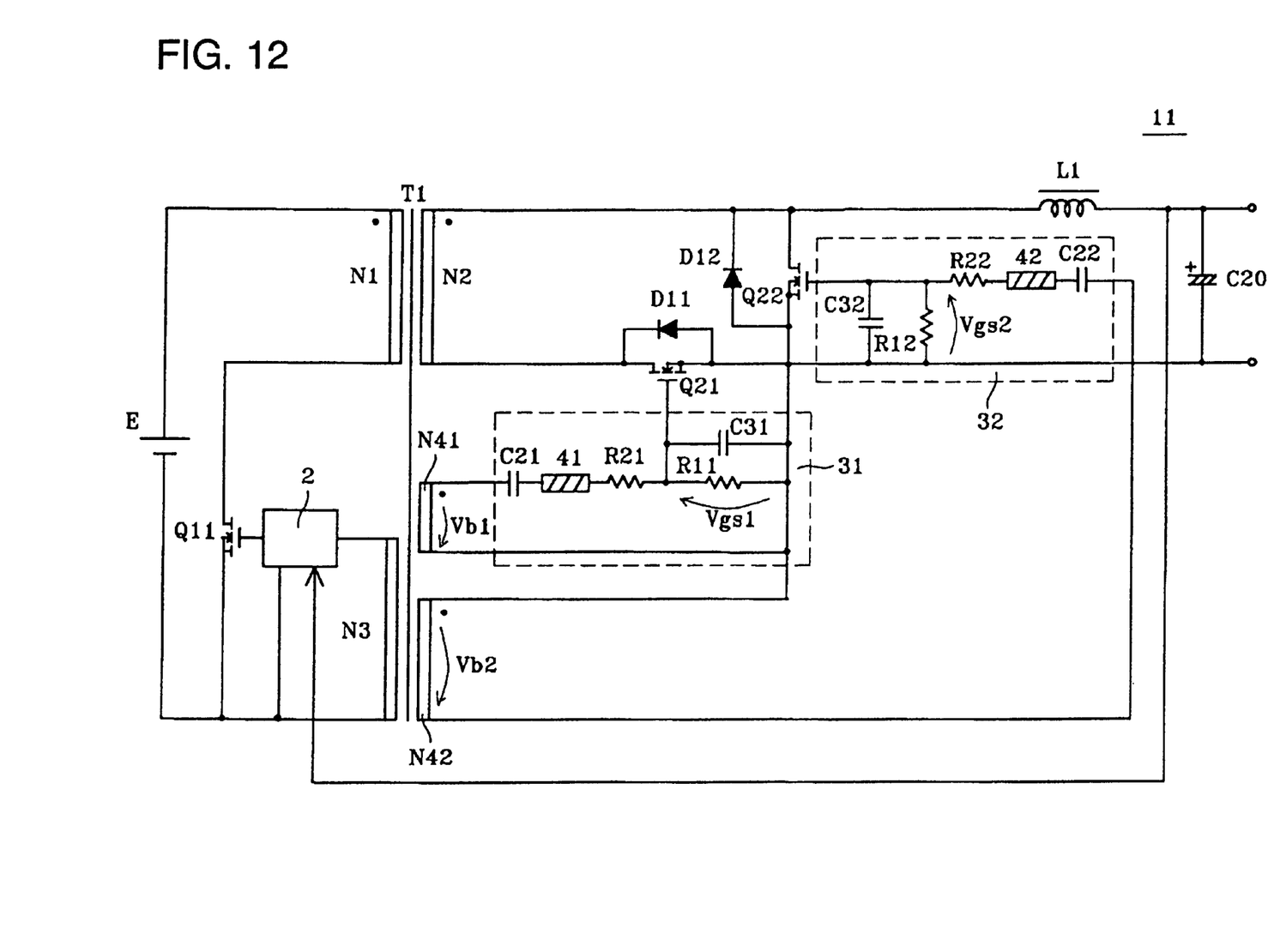
FIG. 12 is a circuit diagram illustrating a switching power supply unit according to a second embodiment of the present invention.

Referring to FIG. 12, a description will be given of the structure of a switching power supply unit according to a second embodiment of the present invention. In this figure, the same parts as those in FIG. 2 or the equivalent thereto are given the same reference numerals and the explanation thereof is omitted.

In FIG. 12, reference numeral 11 indicates a switching power supply unit, which is ordinarily referred to as a forward converter, specifically, which adopts the so-called synchronous rectification system, in which rectification is performed by using two auxiliary switching elements disposed on the secondary side of a transformer. In the switching power supply unit 11, a main switching element repeatedly performs alternate ON/OFF operations, and when it is ON, power is supplied to a load.

The switching power supply unit 11 comprises a transformer T1, an FET Q11 as a main switching element, an FET Q21 and an FET Q22 as auxiliary switching elements, a main control circuit 2 for controlling the ON/OFF operations of the FET Q11, a diode D11 for connecting between the source and the drain of the FET Q21, a diode D12 for connecting between the source and the drain of the FET Q22, a first auxiliary control circuit 31 for controlling the ON/OFF operations of the FET Q21, and a second auxiliary control circuit 32 for controlling the ON/OFF operations of the FET Q22. Reference numeral L1 indicates an inductor as a smoothing circuit and reference numeral C20 indicates a capacitor, similarly, as a smoothing circuit.

The transformer T1 comprises a primary winding N1, a secondary winding N2, a main switching element drive winding (hereinafter referred to as a first drive winding) N3, an auxiliary switching element drive winding ((hereinafter referred to as a second drive winding) N41, and another auxiliary switching element drive winding ((hereinafter referred to as a third drive winding) N42. The FET Q11, the primary winding N1 of the transformer T1, and a DC power supply E are connected in series. The gate of the FET Q11 is connected to an end of the first drive winding N3 via the main control circuit 2. The DC power supply E may be made by rectifying and smoothing an AC input.

The gate and the source of the FET Q21 are connected to the second drive winding N41 via the first auxiliary control circuit 31, and the gate and the source of the FET Q22 are connected to the second drive winding N42 via the second auxiliary control circuit 32.

The first auxiliary control circuit 31 comprises a resistor R11 as a first impedance circuit, a resistor R21 and a bead 41 as a second impedance circuit, a differentiating circuit composed of a capacitor C21 as a first capacitor, and a capacitor C31 as a second capacitor.

The second auxiliary control circuit 32 comprises a resistor R12 as a first impedance circuit, a resistor R22 and a bead 42 as a second impedance circuit, a differentiating circuit composed of a capacitor C22 as a first capacitor, and a capacitor C32 as a second capacitor.

A description will be given of the operations of the switching power supply unit 11 having the above structure.

As the FET Q11 is turned on, voltage having the same polarity as that of the voltage generated in the secondary winding N2 is generated in the second drive winding N41 of the transformer T1. This voltage Vb1 is applied between both ends of the resistor R11 of the first auxiliary control circuit 31, the voltage between both ends of the resistor R11, in other words, the voltage Vgs1 between the gate and the source of the FET Q21, rises. When the voltage Vgs1 exceeds the threshold voltage of the FET Q21, the FET Q21 is turned on. After this, the voltage Vgs1 is attenuated by a CR time constant, and then, when it reaches the threshold voltage, the FET Q21 is turned off.

The FET Q11 is turned off after the FET Q21 has been turned off. Then, voltage Vb2 generated in the third drive winding N42 is applied between both ends of the resistor R12. When the voltage between both ends thereof, that is, the voltage Vgs2 between the gate and the source of the FET Q22 exceeds the threshold voltage of the FET Q22, the FET Q22 is turned on. After this, the voltage Vgs2 attenuated by a CR time constant reaches the threshold voltage of the FET Q22, and the FET Q22 is turned off. Sequentially, the FET Q11 is turned on and then, the operations described above are repeated.

As the FET Q21, there is provided an element, in which voltage drop during an ON time is smaller than forward voltage drop occurring when the diode D11 is in a continuity-state. In addition, the FET Q21 is allowed to operate substantially in synchronism with the rectifying diode D11, with the result that almost no current flows through the diode D11 when the FET Q21 is on. In this case, the FET Q21 acts as a rectifying element. With this arrangement, conductive losses can be greatly reduced, heat-generation of the elements can be prevented, and power conversion factor can be improved.

In addition, similarly, as the FET Q22, an element is used, in which voltage drop during an ON time is smaller than a forward voltage drop occurring when the diode D12 is in a continuity-state. Additionally, making the FET Q21 operate substantially in synchronism with the rectifying diode D12 can contribute to significant reduction in conductive losses, prevention of heat-generation of the elements, and improvement of power conversion factor.

Adding to the above advantages, in the switching power supply unit according to this embodiment, the same advantages as those in the first embodiment can be obtained by using the two auxiliary switching element control circuits, and the detailed explanation thereof is omitted.

The two auxiliary switching element control circuits should not be limited to those shown in FIG. 12, and the one shown in FIG. 7 may also be used. Furthermore, as the impedance circuits constituting the two auxiliary switching element control circuits, one of those shown in FIGS. 8 to 11 may be used.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply unit for providing a DC output comprising:
   a DC power supply;
   a transformer having a primary winding;
   a main switching element performing ON/OFF operations and connected in series with the primary winding; and
   an auxiliary switching element for performing ON/OFF operations in synchronism with or opposite to the ON/OFF operations performed by the main switching element the auxiliary switching element having an ON time;
   the transformer having an auxiliary switching element drive winding;
   wherein the auxiliary switching element drive winding generates a voltage turning on and off the auxiliary switching element; and further comprising:
   a first impedance circuit including a first resistor, a first capacitor being connected in series with the first impedance circuit, and a differentiating circuit for determining a timing for turning on the auxiliary switching element and the ON time thereof and being connected to the auxiliary switching element drive winding.

2. The switching power supply unit of claim 1, wherein the auxiliary switching element comprises a transistor having a gate, source and drain, the gate being connected to an end of the auxiliary switching element drive winding via the first capacitor, the source being connected to the other end of the auxiliary switching element drive winding and the first impedance circuit being connected between the gate and the source of the transistor.

3. The switching power supply unit of claim 1, wherein the differentiating circuit comprises a second impedance circuit connected in series to the first capacitor.

4. The switching power supply unit of claim 3, wherein the second impedance circuit includes one of a second resistor and an inductor.

5. The switching power supply unit of claim 3, wherein an impedance value of one of the first and second impedance circuits or the impedance values of both thereof vary with a direction of current flowing through one or both of the impedance circuits.

6. The switching power supply unit of claim 1, wherein a second capacitor is connected in parallel to the first impedance circuit.

7. The switching power supply unit of claim 1, wherein an impedance value of the first impedance circuit varies with the DC output or a signal from outside of the first impedance circuit.

8. The switching power supply unit of claim 1, wherein the first impedance circuit comprises a resistor and a circuit responsive to an external control signal.

9. The switching power supply unit of claim 8, wherein the first impedance circuit comprises a phototransistor of a photo coupler circuit.

10. The switching power supply unit of claim 1, wherein the first impedance circuit includes a diode.

11. The switching power supply unit of claim 10, wherein the first impedance circuit includes two oppositely polarized diodes in parallel.

12. The switching power supply unit of claim 1, wherein the first impedance circuit includes a zener diode.

13. The switching power supply unit of claim 1, wherein the differentiating circuit comprises said first resistor and said first capacitor connected in series.

14. The switching power supply unit of claim 13, wherein the differentiating circuit comprises a further resistor and an inductive element in series with said first resistor and said first capacitor.

15. The switching power supply unit of claim 1, further comprising a second capacitor in parallel with the first resistor.

16. The switching power supply unit of claim 1, wherein the auxiliary switching element is coupled to the primary winding of said transformer.

17. The switching power supply unit of claim 1, wherein the auxiliary switching element is coupled to the secondary winding of said transformer.

* * * * *